(12) United States Patent
Peng et al.

(10) Patent No.: US 9,143,625 B2
(45) Date of Patent: *Sep. 22, 2015

(54) SELECTION OF WIRELESS DEVICES AND SERVICE PLANS

(71) Applicant: Amazon Technologies, Inc., Reno, NV (US)

(72) Inventors: Shih-Ta Peng, San Marino, CA (US); Charles Steven Johnson, Snohomish, WA (US); Aaron C. Rubenson, Seattle, WA (US); Gregor Moulton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/320,683

(22) Filed: Jul. 1, 2014

(65) Prior Publication Data

US 2014/0315516 A1 Oct. 23, 2014

Related U.S. Application Data

(63) Continuation of application No. 13/896,555, filed on May 17, 2013, now Pat. No. 8,805,341, which is a continuation of application No. 12/787,039, filed on May 25, 2010, now Pat. No. 8,447,279.

(51) Int. Cl.
*H04M 3/42* (2006.01)
*H04M 15/00* (2006.01)
*G06Q 30/00* (2012.01)

(52) U.S. Cl.
CPC .............. *H04M 15/745* (2013.01); *G06Q 30/00* (2013.01); *H04M 15/75* (2013.01)

(58) Field of Classification Search
USPC ................ 455/406, 414.1, 414.2, 432.3, 433, 455/435.1
See application file for complete search history.

(56) References Cited

U.S. PATENT DOCUMENTS

2008/0166993 A1* 7/2008 Gautier et al. ................ 455/405

* cited by examiner

*Primary Examiner* — Temica M Beamer
(74) *Attorney, Agent, or Firm* — Thomas | Horstemeyer, LLP (57) ABSTRACT

Disclosed are various embodiments for selection of wireless devices and service plans. A geographic location and a plurality of wireless preferences are associated with a user. Wireless service plans, offered by at least one wireless carrier that services the geographic location, that meet the wireless preferences associated with the user are determined. A user interface is generated that presents the wireless service plans in a ranked order that is determined utilizing at least the wireless preferences.

20 Claims, 6 Drawing Sheets

SELECTION OF WIRELESS DEVICES AND SERVICE PLANS

CROSS-REFERENCE TO RELATED APPLICATIONS

This application is a continuation of, and claims priority to, U.S. patent application entitled "SELECTION OF WIRELESS DEVICES AND SERVICE PLANS," filed on May 17, 2013, and assigned application Ser. No. 13/896,555, which is a continuation of, and claims priority to, U.S. Pat. No. 8,447,279 entitled "SELECTION OF WIRELESS DEVICES AND SERVICE PLANS, filed on May 25, 2010, which are incorporated herein by reference in their entireties.

BACKGROUND

Each potential wireless customer may have certain preferences regarding a type of wireless device and a type of wireless service plan. For example, a customer may prefer a flip-style cellular telephone instead of a bar-style cellular telephone. The customer may also prefer a multi-line family wireless plan with a certain set of features. However, the wireless carriers that service the area of the customer may not support the desired telephone model of the customer or offer service plans meeting the preferences of the customer.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating the selection of wireless devices and service plans across multiple wireless carriers that provide service in an area. Most wireless devices are compatible with a limited subset of wireless carriers, and wireless devices are often bundled with a contract for wireless service. Wireless service plans may have vastly differing feature sets and prices. Furthermore, different wireless carriers may provide different levels of service to an area. Thus, comparison and selection of wireless devices and service plans across wireless carriers is a complex issue. Various embodiments of the present disclosure provide a stepped interface showing a user the various options for devices and service plans from multiple wireless carriers that are available and meet specified criteria. Options for service plans and devices may be ranked according to popularity, customer satisfaction, and/or other criteria. In the following discussion, a general description of the system and its components is provided, followed by a discussion of the operation of the same.

Figure 1:
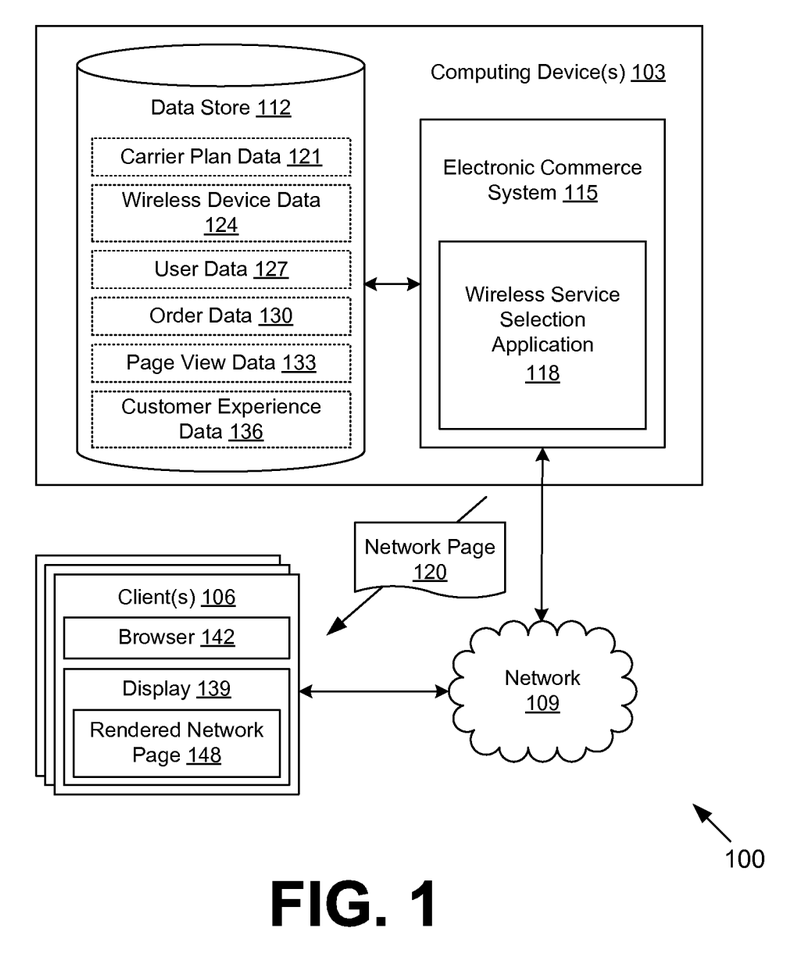
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, cellular telephone networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores as can be appreciated. The data stored in the data store 112, for example, is associated with the operation of the various applications and/or functional entities described below.

The components executed on the computing device 103, for example, include an electronic commerce system 115, a wireless service selection application 118, and other applications, services, processes, systems, engines, or functionality not discussed in detail herein. The electronic commerce system 115 is executed in order to facilitate the online purchase of wireless devices, wireless service plans, and/or other items over the network 109. The electronic commerce system 115 also performs various backend functions associated with the online presence of a merchant in order to facilitate the online purchase of items as will be described. For example, the electronic commerce system 115 generates network pages 120 such as web pages or other types of network content that are provided to clients 106 for the purposes of selecting items for purchase, rental, download, lease, or other form of consumption as will be described. In one embodiment, the electronic commerce system 115 is configured for a reseller of wireless services offered by a plurality of wireless carriers.

The wireless service selection application 118, which may be part of the electronic commerce system 115, is executed to facilitate the selection of wireless devices and wireless plans for a user, given a specified geographic location or area. To this end, the wireless service selection application 118 may guide a user through the selection of a wireless device and then a compatible wireless service plan. Alternatively, the wireless service selection application 118 may guide the user through the selection of a wireless service plan and then a compatible wireless device.

The data stored in the data store 112 includes, for example, carrier plan data 121, wireless device data 124, user data 127, order data 130, page view data 133, customer experience data 136, and potentially other data. The carrier plan data 121 describes a feature set for each of a plurality of wireless service plans offered by a plurality of wireless carriers. For example, for each wireless service plan, the carrier plan data 121 may describe features including, but not limited to, a number of weekday voice minutes per billing period, a number of night and weekend minutes per billing period, text messaging capabilities included, overage charges, whether unused minutes rollover to the next billing period, whether calls to designated numbers avoid airtime charges, whether calls to other users of the wireless carrier avoid airtime charges, starting and ending times for nights and weekends, data plan charges, additional line charges, and/or other features. The carrier plan data 121 may also specify geographic areas in which the wireless service plan is available.

The wireless device data 124 describes a plurality of wireless devices, including their respective feature sets and with which types of wireless networks they are compatible. As a non-limiting example of feature sets, some wireless devices may have digital cameras and/or music players, while others may not. As another non-limiting example, some wireless devices may have keyboards, while others may have touch screens. Regarding wireless network compatibility, as non-limiting examples, one wireless device may be compatible with Global System for Mobile Communications (GSM) wireless networks, while another wireless device may be compatible with Code Division Multiple Access (CDMA) wireless networks, while still another wireless device may compatible with both GSM and CDMA networks.

The user data 127 includes data pertaining to users, which may include, for example, stored preferences of users, current wireless service plans of users, geographic locations of users, and/or other information. The order data 130 may include data relating to orders of wireless service plans, wireless devices, bundles of wireless service plans and wireless devices, and other items. The page view data 133 may include data relating to views of network pages 120 which may be associated with various wireless devices and/or wireless service plans. The customer experience data 136 may include data that relates to customer reviews, ratings, and/or preferences with respect to wireless devices, wireless carriers, wireless service plans, features, and/other factors.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability. The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 142 and/or other applications. The browser 142 may be executed in a client 106, for example, to access and render network pages 120, such as web pages, or other network content served up by the computing device 103 and/or other servers. A rendered network page 148 may be displayed on the display 139. The client 106 may be configured to execute applications beyond browser 142 such as, for example, email applications, instant message applications, and/or other applications.

Next, a general description of the operation of the various components of the networked environment 100 is provided. To begin, a user at a client 106 may access a network page 120 served up by the wireless service selection application 118 and provide initial information. Such initial information may include, for example, the geographic location of the user. Non-limiting examples of geographic locations may include a postal code, a street address, latitude and longitude coordinates, a city, a town, a state, a county, a borough, a parish, a census designated area, a neighborhood, a subdivision, an unincorporated community, and other geographic locations.

The geographic location may be obtained explicitly or implicitly from the client 106. For example, a user may click on a graphical map, enter a zip code, or perform some other action to explicitly provide the geographic location. The geographic location may be provided implicitly as well. Such information may include an internet protocol (IP) address, a telephone number, etc., that may be used for geolocation. Also, a user may have previously registered with the electronic commerce system 115, so an identification of the user, for example, through cookies, security credentials, etc., may point to a stored geographic location in the user data 127. Further, the client 106 may include a global positioning system (GPS) device or may determine a geographic location by way of trilateration using various other mobile base stations having known locations.

The user may also provide various initial preferences to the wireless service selection application 118. For example, the user may indicate that new service is requested, that an existing service is to be changed, that a new wireless device is requested, and/or other actions to be taken by the wireless service selection application 118. The user may indicate current telephone number, current wireless carrier, current wireless service plan/package, and/or other background information. In one embodiment, preferences relating to a wireless device identify attributes of wireless devices rather than a specific wireless device.

The wireless service selection application 118 then may generate one or a series of network pages 120 to guide the user through the selection of a wireless service plan and/or wireless device. It is understood that the selection of a wireless service plan may occur first or that the selection of the wireless device may occur first. In other embodiments, the selection may happen concurrently. Which sequence is used may depend on configuration of the wireless service selection application 118, user preferences, and/or other factors.

If a wireless device is to be selected first, the wireless service selection application 118 may obtain preferences relating to wireless devices from the user. The wireless service selection application 118 may also determine which wireless devices are compatible with wireless carriers that provide service to the geographic location obtained from the user. To this end, the wireless service selection application 118 may determine whether the geographic location is within or coextensive with an area serviced by the wireless service plans in the carrier plan data 121. The wireless service selection application 118 may also determine whether each of the wireless devices is compatible with the wireless carriers offering the wireless service plans using the wireless device data 124.

The wireless devices compatible with plans at the geographic location are then presented to the user in a network page 120. The wireless service selection application 118 generates the network page 120 listing the wireless devices in a ranked order. The ranked order may be based, for example, on wireless device preferences, customer experience data 136, wireless device selection data, and/or other data. The wireless device selection data may be generated from the order data 130, the page view data 133, and/or other data in order to determine a measure of popularity of the respective wireless device. A measure of popularity may be, for example, a frequency of customer selection of the respective wireless device. The network page 120 is then sent to the client 106 by way of the network 109.

After the user selects one or more of the wireless devices and provides preferences relating to wireless service, the wireless service selection application 118 may then generate a network page 120 presenting the wireless service plans from one or more wireless carriers that are available in the area including the geographic location of the user and that are compatible with the selected wireless device(s). The wireless service plans may be presented in a ranked order that is based, for example, on the wireless service preferences, customer experience data 136, wireless service plan selection data, and/or other data. The wireless service plan selection data may be generated from the order data 130, the page view data 133, and/or other data in order to determine a measure of popularity of the respective wireless service plan. A measure of popularity may be, for example, the frequency of customer selection of the respective wireless service plan. The network page 120 is sent to the client 106 by way of the network 109.

A user selection of one or more of the wireless service plans may be obtained from the client 106. Accordingly, the electronic commerce system 115 in conjunction with the wireless service selection application 118 may facilitate the placing of an order for the selected wireless service plan(s) and selected wireless device(s) through a wireless reseller and/or a wireless carrier. The electronic commerce system 115 may communicate over the network 109 with one or more external computing systems to submit the order(s).

Alternatively, a user may specify one or more wireless service plans first. To this end, the wireless service selection application 118 may obtain a plurality of wireless service preferences from the user and then generate a network page 120 listing wireless service plans that are offered by one or more wireless carriers at the geographic location of the user. The wireless service plans may be in a ranked order that is based, for example, on the wireless service preferences, customer experience data 136, wireless service plan selection data, and/or other data. The network page 120 is sent to the client 106. Subsequently, the user may select one or more of the wireless service plans.

The wireless service selection application 118 then may determine which wireless devices are compatible with the selected wireless service plan(s). The wireless service selection application 118 may then generate a network page 120 listing the wireless devices that are compatible with the selected wireless service plan(s). The wireless devices may be presented in a ranked order based, for example, on wireless device preferences, customer experience data 136, wireless device selection data, and/or other data. The selected wireless service plan(s) and/or wireless device(s) may then be submitted as an order.

Alternatively, a user may already have a wireless service plan and be seeking to purchase a new wireless device, or the user may already have a wireless device and be seeking to sign up for a new wireless service plan. In such cases, the user may be able to enter indications of the existing wireless device or wireless service plan and the wireless service selection application 118 may be configured to provide choices of wireless devices or wireless service plans according to the indications.

Moreover, in various embodiments, wireless service plans may be presented to a user as a package, including a recommended wireless device. Other services and features may be included within the package, such as, but not limited to, cable television service, satellite television service, home phone service, Internet access, and/or other services and features. In one embodiment, the user may specify wireless preferences including preferences for wireless plans and wireless devices. In other words, the user may inform the wireless service selection application 118 of all of the wireless needs of the user. Based at least in part upon the wireless preferences, the wireless service selection application 118 may generate a set of packages or bundles to be presented to the user. It may be the case that not all of the packages meet all of the wireless needs of the user. Further, in some embodiments, some of the wireless needs of the user may be incompatible with one another or may not be met by any one package. To this end, the wireless service selection application 118 may assign scores to the packages relative to how well they meet the indicated wireless needs of the user. The scores may be used in ranking the packages for presentation to the user.

In one embodiment, a user may be asked by the wireless service selection application 118 to identify any existing wireless devices, wireless service plans, and/or packages thereof. The wireless service selection application 118 may use such information to offer wireless device, wireless service plans, and/or packages that are similar to the existing wireless devices, wireless service plans, and/or packages. To this end, the various feature sets of each could be compared and a similarity score computed. In one embodiment, all available and compatible devices, plans, and/or packages may be shown in one or more rendered network pages 148 in a ranked order determined by the similarity scores. In another embodiment, the available and compatible devices, plans, and/or packaging having similarity scores that meet or exceed a threshold may be shown in one or more rendered network pages 148.

In comparing various wireless service plans for similarity and/or determining whether a wireless service plan meets wireless service preferences, a feature set associated with a wireless service plan may be normalized. As a non-limiting example, a premium wireless service plan may include unlimited text messaging. For purposes of comparison with a non-premium wireless service plan, an option of unlimited text messaging for the non-premium wireless service plan may be included for comparison purposes. The non-premium wireless service plan may be a better deal when the unlimited text messaging option is included.

In various embodiments, a wireless device preference or a wireless service preference may be optional. In other words, in some embodiments, that a wireless service plan does not include unlimited text messaging when a user specified a preference for unlimited text messaging may not mean that the wireless service plan is excluded for consideration. Indeed, the meeting of numerous other ones of the preferences may make the particular wireless service plan a good match.

The user preferences may be associated with weights in some embodiments. To this end, a user may be able to mark a preference as mandatory, completely optional, or at some degree in between. For instance, a user may set a mandatory preference for having a wireless service plan priced below a certain monthly rate, but also set a completely optional preference for unlimited weekends. In one embodiment, weights for certain types of preferences may be predetermined. As a non-limiting example, it may be the case that users who indicate a preference for unlimited data transfer are observed to never select a plan without unlimited data transfer. In such a case, a preference for unlimited data transfer may be predetermined to be mandatory. Furthermore, the weights may be empirically determined automatically in response to user behavior when the preferences are not strictly followed.

Figure 2:
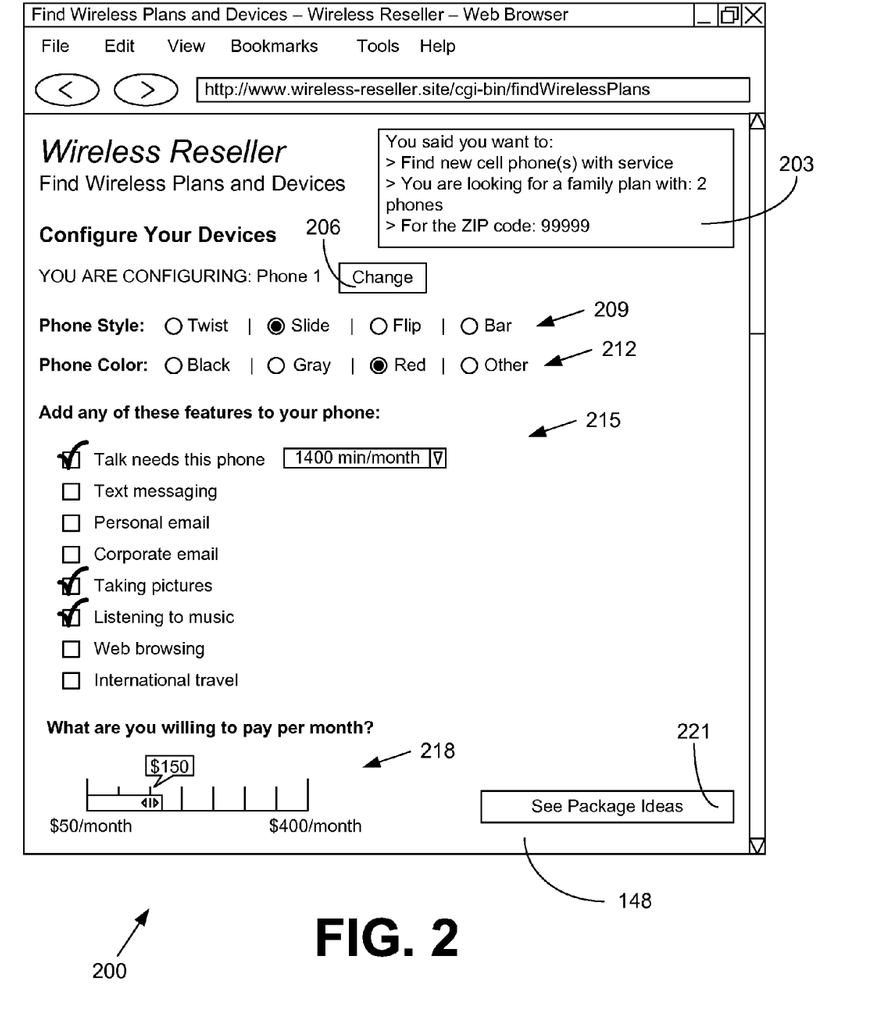
FIGS. 2-4 are drawings of examples of user interfaces rendered by a client in the networked environment of FIG. 1 according to various embodiments of the present disclosure.

Referring next to FIG. 2, shown is a drawing of a user interface 200 rendered by a browser 142 (FIG. 1) executing in a client 106 (FIG. 1) in the networked environment 100 (FIG. 1) according to various embodiments of the present disclosure. Specifically, the user interface 200 depicts one example of a rendered network page 148. In this example, a rendered network page 148 has been generated by the wireless service selection application 118 (FIG. 1) to collect user preferences for wireless devices and service plans.

The rendered network page 148 includes an initial preference panel 203 that displays several initial preferences indicated by the user. For example, the initial preference panel 203 shows that a user has indicated a preference for buying new wireless devices with a wireless service plan and a preference for a family-type wireless service plan with two lines. The initial preference panel 203 indicates that a geographic location of "99999" has been determined from information obtained from the user.

Various other preferences are configurable in the rendered network page 148. A first phone ("Phone 1") is indicated as being configured, but a change component 206 is provided to change to another phone, to add a phone, or perform some other action. The rendered network page 148 includes phone style configuration components 209 and phone color configuration components 212 as examples of wireless device preferences. Although they are shown as radio buttons, the phone style configuration components 209 and the phone color configuration components 212 may comprise other types of user interface components, such as buttons, links, sliders, checkboxes, text areas, drop-down boxes, and so on.

Additional features 215 may be configured for both the wireless device and the wireless service plan. Although wireless device preferences may be displayed separately from wireless service plan preferences, they may also be mixed together, as is shown by the additional features 215. Although shown with checkboxes and drop-down boxes, it is understood that the additional features 215 may be specified in conjunction with any type of user interface component, including, for example, buttons, radio buttons, links, sliders, text areas, and so on.

A price preference indicator 218 is shown to specify a price preference range for the wireless service plans. Another price preference indicator 218 may be included to specify a price preference range for wireless devices. However, it may be the case that wireless devices are of negligible additional cost due to their subsidization by the wireless carriers. Although the price preference indicator 218 is shown using a slider, it is understood that the price preference indicator 218 may use any type of user interface component, such as text areas, checkboxes, buttons, radio buttons, drop-down boxes, links, etc. A submit component 221, such as, for example, a button, may be provided to send the information collected from the user in the user interface 200 to the wireless service selection application 118.

In one embodiment, the user interface 200 may be configured to ensure that incompatible preferences are not selected. For example, a first feature 215 and a second feature 215 may be incompatible. The user interface 200 may be configured to disable the selection of the second feature 215 when the first feature 215 is selected. Compatibility of preferences may be determined dynamically by the wireless service selection application 118 based on available wireless service plans and wireless devices.

Figure 3:
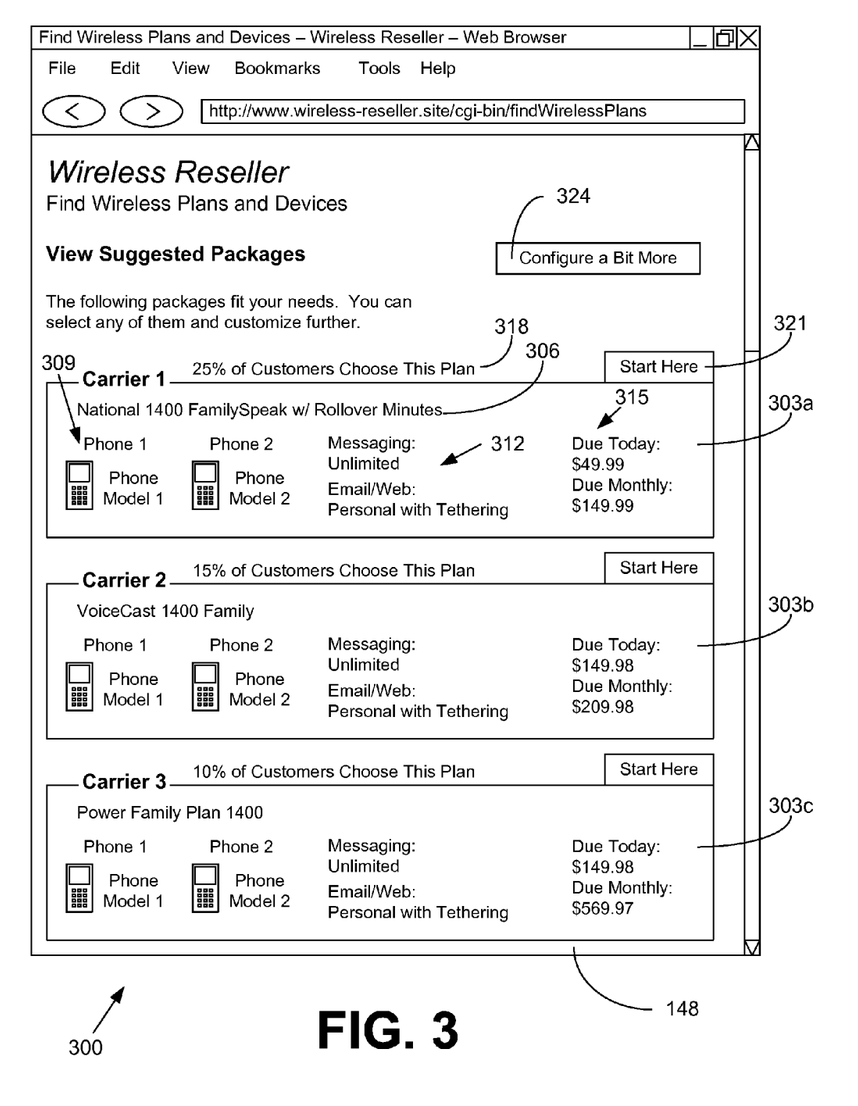

Turning now to FIG. 3, shown is a drawing of another user interface 300 rendered by a browser 142 (FIG. 1) executing in a client 106 (FIG. 1) in the networked environment 100 (FIG. 1) according to various embodiments of the present disclosure. Specifically, the user interface 300 depicts another example of a rendered network page 148. In this example, a rendered network page 148 has been generated by the wireless service selection application 118 (FIG. 1) to present examples of wireless service packages 303 to the user.

Each of the wireless service packages 303 has a title 306, wireless device features 309, plan features 312, and pricing information 315. It is understood that more or less information may be presented in connection with each wireless service package 303. In some embodiments, a wireless device may be presented by itself for selection. In other embodiments, a wireless service plan may be presented by itself for selection. Each of the wireless service packages 303 may also include a popularity indication 318 to show a frequency of selection of the respective wireless service package 303 by customers. The ranking of the wireless service packages 303 in the rendered network page 148 may be according to the respective popularity indication 318 and other factors. Each of the wireless service packages 303 may be presented with a respective selection component 321, shown as a button labeled "Start Here," for sending a selection of the corresponding wireless service package 303 to the wireless service selection application 118. The selected wireless service package 303 may be further configured by way of another user interface shown in FIG. 4. Although the selection components 321 are shown as buttons, other user interface components may be used instead.

In this example, each of the wireless service packages 303a, 303b, and 303c is offered by a different wireless carrier. Multiple wireless service packages 303 may be offered for a wireless carrier in other examples. In such examples, the wireless service packages 303 may be grouped by wireless carrier or may not be grouped by wireless carrier. Where wireless service packages 303 are grouped by wireless carrier, the groupings may be ordered according, for example, to customer satisfaction or popularity of the respective wireless carrier.

The user interface 300 may include a retrogression component 324 for moving backward to a previous rendered network page 148 for further configuration. For example, selecting the retrogression component 324 may return the user to the user interface 200 (FIG. 2). The retrogression component 324 is labeled as "Configure a Bit More" and is shown as a button, although other user interface components may be used.

Figure 4:
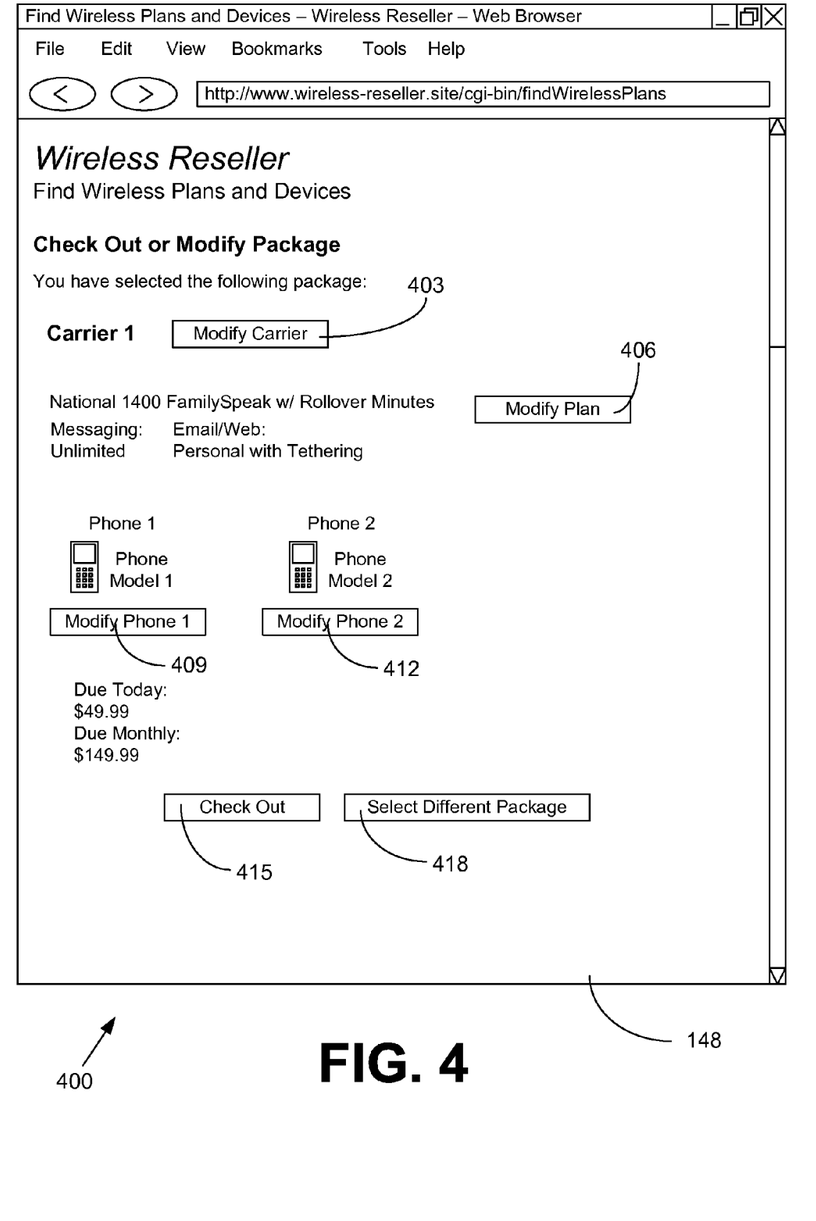

Moving on to FIG. 4, shown is a drawing of another user interface 400 rendered by a browser 142 (FIG. 1) executing in a client 106 (FIG. 1) in the networked environment 100 (FIG. 1) according to various embodiments of the present disclosure. Specifically, the user interface 400 depicts yet another example of a rendered network page 148. In this example, a rendered network page 148 has been generated by the wireless service selection application 118 (FIG. 1) to allow a user to check out or modify the features of a selected one of the wireless service packages 303 (FIG. 3).

The user interface 400 includes a carrier modification component 403 for modifying the selected wireless carrier, a plan modification component 406 for modifying the selected wireless service plan, and device modification components 409, 412 for modifying the selected wireless devices. The user interface 400 may also include a check out component 415 for finalizing a selection of the wireless service package 303 and proceeding to an order stage. The user interface 400 may also include a retrogression component 418 for returning to a previous rendered network page 148 in order to select a different wireless service package 303 or for the user to specify different needs.

Selection of any of these components may trigger another user interface to be rendered in the browser 142, such as another rendered network page 148, a new display region in the same rendered network page 148, a pop-up window, a pop-over window, etc. Although these components are shown as buttons, it is understood that the components may comprise other types of user interface components in other embodiments.

Figure 5:
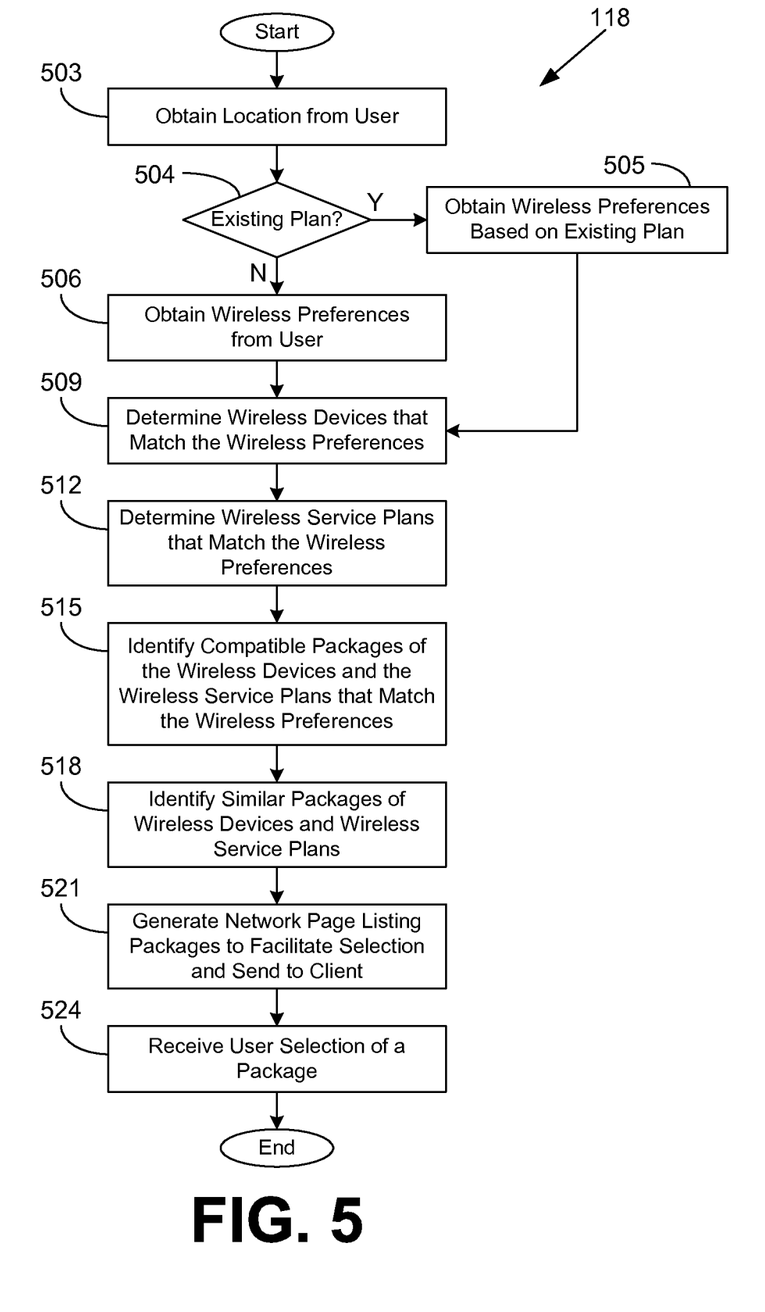
FIG. 5 is a flowchart illustrating one example of functionality implemented as portions of a wireless service selection application executed in a computing device in the networked environment of FIG. 1 according to various embodiments of the present disclosure.

Referring next to FIG. 5, shown is a flowchart that provides one example of the operation of a portion of the wireless service selection application 118 according to various embodiments. It is understood that the flowchart of FIG. 5 provides merely an example of the many different types of functional arrangements that may be employed to implement the operation of the portion of the wireless service selection application 118 as described herein. As an alternative, the flowchart of FIG. 5 may be viewed as depicting an example of steps of a method implemented in the computing device 103 (FIG. 1) according to one or more embodiments.

Beginning with box 503, the wireless service selection application 118 obtains location information from the user at a client 106 (FIG. 1). In some embodiments, an implicit indication of a location may be obtained rather than an explicit designation of a location. In box 504, the wireless service selection application 118 determines whether the user has indicated information regarding an existing wireless service plan or package. If the user has specified an existing plan, the wireless service selection application 118 proceeds to box 505 and obtains wireless preferences based on the features of the existing wireless service plan and/or wireless device. The wireless service selection application 118 then moves to box 509. If the user has not specified an existing plan in box 504, or if new preferences are to be obtained, the wireless service selection application 118 otherwise moves to box 506. In box 506, the wireless service selection application 118 obtains wireless preferences from a user. The wireless preferences may be obtained through a user interface such as, for example, user interface 200 (FIG. 2). Such wireless preferences may relate to wireless device preferences, wireless service plan preferences, and/or other preferences relating to the needs of a user regarding wireless service.

In box 509, the wireless service selection application 118 determines wireless devices that match the wireless preferences. As non-limiting examples, a user may have indicated a preference for a wireless device including a camera, a preference for a wireless device including music-playing capability, a preference for a wireless device including a QWERTY keypad, and/or other device-related preferences. In box 512, the wireless service selection application 118 determines wireless service plans that match the wireless preferences. As non-limiting examples, a user may have indicated a preference for a plan having a monthly charge under a certain amount, a preference for a plan including unlimited text messaging, a preference for a plan including rollover minutes, and/or other plan-related preferences.

In box 515, the wireless service selection application 118 identifies compatible packages of the wireless devices and the wireless service plans that match the wireless preferences. It may be the case that not all of the wireless preferences of the user can be matched by a package, for example, due to incompatibilities of devices and plans. Thus, in some embodiments, packages that best match the wireless preferences may be identified. Such packages may be ranked by a score associated with the quality of the match compared with the preferences of the user. In box 518, the wireless service selection application 118 identifies packages of wireless devices and wireless service plans that are similar to those identified in box 515. Such packages may represent lower quality matches in terms of the user preferences, but may provide additional variety for the user if the user is dissatisfied with the packages identified in box 515. In some embodiments, the wireless service selection application 118 may identify packages that are similar to a current wireless package of the user.

In box 521, the wireless service selection application 118 generates a network page 120 (FIG. 1) listing one or more of the identified packages. The network page 120 facilitates selection of one or more of the packages and is sent to a client 106. As indicated above, the packages may be ranked in terms of how well the packages match the needs of the user as expressed by the wireless preferences of the user. Further, the packages may also be ranked based in part on how often the packages are selected by other users. In box 524, the wireless service selection application 118 receives a user selection of one or more of the identified packages. In some embodiments, the user may be able to configure or modify features associated with the package through, for example, subsequent network pages 120. Thereafter, the wireless service selection application 118 ends.

Figure 6:
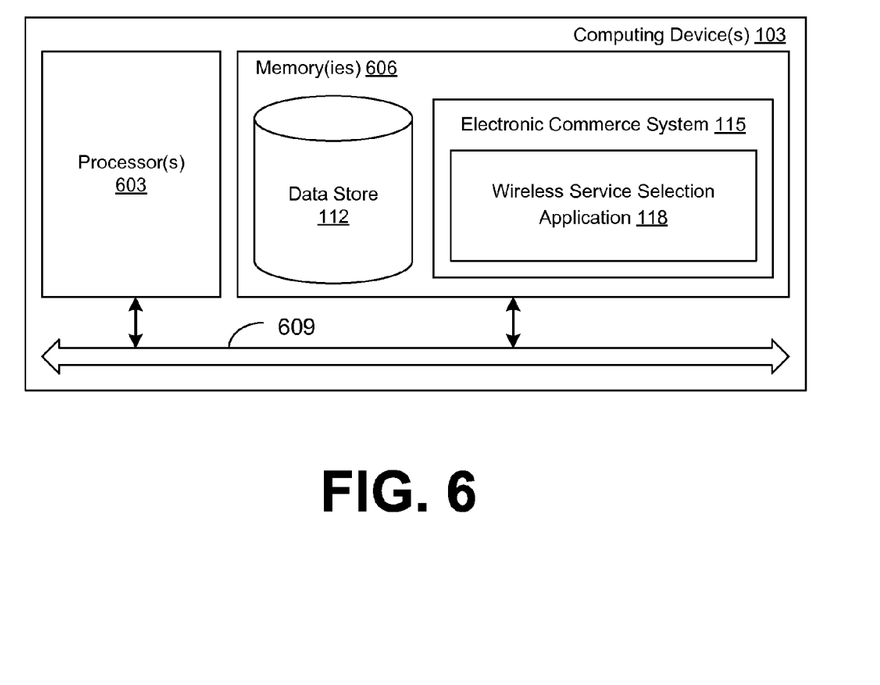
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the electronic commerce system 115, the wireless service selection application 118, and potentially other applications. Also stored in the memory 606 may be a data store 112 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the electronic commerce system 115, the wireless service selection application 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the wireless service selection application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 115 and the wireless service selection application 118, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having specific computer-executable instructions that, when executed by a computing device, cause the computing device to at least:

identify a plurality of wireless service plans for a user, each wireless service plan of the plurality of wireless service plans meeting at least one wireless service preference associated with the user, and each wireless service plan of the plurality of wireless service plans being offered by at least one wireless carrier that provides service to a geographic location associated with the user;

identify at least one wireless device that satisfies at least one wireless device preference associated with the user;

identify a plurality of wireless packages for the user, each wireless package of the plurality of wireless packages including the identified at least one wireless device and at least one wireless service plan of the identified plurality of wireless service plans with which the identified at least one wireless device is compatible;

generate a ranking of the identified plurality of wireless packages; and encode a user interface to present the identified plurality of wireless packages according to the ranking.

2. The non-transitory computer-readable medium of claim 1, wherein the specific computer-executable instructions, when executed by the computing device, further cause the computing device to at least:

receive a selection of at least one wireless package of the identified plurality of wireless packages via the user interface; and initiate an order for the at least one wireless package in response to the selection.

3. The non-transitory computer-readable medium of claim 1, wherein the specific computer-executable instructions, when executed by the computing device, further cause the computing device to at least:

identify at least one similar wireless package that is similar to at least one wireless package of the identified plurality of wireless packages and that is compatible with the identified at least one wireless device; and update the ranking to include the at least one similar wireless package.

4. A system comprising:

an electronic data store configured to store geographic location data in association with a user; and a computing device including a processor comprising hardware, the computing device in communication with the electronic data store and configured to at least:

identify a plurality of wireless service plans, wherein each wireless service plan of the plurality of wireless service plans:

meets at least one wireless service preference associated with a user, and is available in a geographic area associated with the user;

identify at least one wireless device that satisfies at least one wireless device preference associated with the user;

generate a ranked order for a plurality of wireless packages, wherein each wireless package of the plurality of wireless packages includes the at least one wireless device and at least one wireless service plan of the plurality of wireless service plans.

5. The system of claim 4, wherein the computing device is further configured to at least generate instructions for displaying a user interface that presents the plurality of wireless packages in the ranked order.

6. The system of claim 5, wherein at least one of the plurality of wireless service plans that is incompatible with the at least one wireless device is excluded from the plurality of wireless packages presented in the user interface.

7. The system of claim 4, wherein the ranked order is generated based at least in part on historical customer experience data associated with the plurality of wireless service plans.

8. The system of claim 4, wherein the ranked order is generated based at least in part on a frequency of customer selection of at least one wireless service package of the plurality of wireless service packages.

9. The system of claim 4, wherein the ranked order is generated based at least in part on the at least one wireless service preference associated with the user with which the plurality of wireless service plans meet.

10. The system of claim 9, wherein the at least one wireless service preference associated with the user comprises an optional wireless service preference.

11. The system of claim 9, wherein the at least one wireless service preference associated with the user comprises a weighted wireless service preference.

12. The system of claim 4, wherein the ranked order is generated based at least in part on a score determined for each wireless package of the plurality of wireless packages, the score describing a similarity of a corresponding wireless package of the plurality of wireless packages to the at least one wireless service preference and the at least one wireless device preference associated with the user.

13. The system of claim 4, wherein the at least one wireless device preference identifies at least one of a desired feature set or a desired price range for the at least one wireless device.

14. A computer-implemented method comprising:

determining, by a computing device, a plurality of wireless service plans, wherein each wireless service plan of the plurality of wireless service plans:

meets at least one wireless service preference associated with a user, and is available in a geographic area associated with the user;

determining, by the computing device, at least one wireless device that satisfies at least one wireless device preference associated with the user; and generating, by the computing device, a ranked order for a plurality of wireless packages, wherein each wireless package of the plurality of wireless packages includes in the at least one wireless device and at least one wireless service plan of the plurality of wireless service plans.

15. The computer-implemented method of claim 14, further comprising generating, by the computing device, instructions for displaying a user interface that presents the plurality of wireless packages in the ranked order.

16. The computer-implemented method of claim 15, wherein at least one incompatible wireless service plan of the plurality of wireless service plans that is incompatible with the at least one wireless device is excluded from the plurality of wireless packages presented in the user interface.

17. The computer-implemented method of claim 14, wherein:

the at least one wireless device preference comprises a plurality of wireless device preferences, at least a subset of the plurality of wireless device preferences being optional; and the ranked order of the plurality of wireless packages being determined based at least in part on a number of the subset of the plurality of wireless device preferences that are met by the at least one wireless device.

18. The computer-implemented method of claim 14, wherein the at least one wireless device preference further comprises a desired feature set or a desired price range for the at least one wireless device.

19. The computer-implemented method of claim 14, wherein the at least one wireless preference specifies a desired feature set or a desired price range for a desired wireless service plan.

20. The computer-implemented method of claim 14, wherein the ranked order is generated based at least in part on a score determined for each wireless package of the plurality of wireless packages, the score describing a similarity of each wireless package of the plurality of wireless packages to the at least one wireless service preference and the wireless device preference associated with the user.

* * * * *